United States Patent
von Cavallar et al.

(10) Patent No.: US 10,983,032 B2
(45) Date of Patent: Apr. 20, 2021

(54) AUTOMATIC CONTROL OF THE SEPARATION AND COLLECTION OF FLUID

(71) Applicant: International Business Machines Corporation, Armonk, NY (US)

(72) Inventors: Stefan von Cavallar, Sandringham (AU); Kerry J. Halupka, Northcote (AU); Rahil Garnavi, Macleod (AU); Rajib Chakravorty, Epping (AU); Suman Sedai, Hughesdale (AU)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/188,986

(22) Filed: Nov. 13, 2018

(65) Prior Publication Data

US 2020/0150001 A1  May 14, 2020

(51) Int. Cl.
  *G01N 1/20* (2006.01)
  *G01F 1/66* (2006.01)
  *G05D 7/06* (2006.01)

(52) U.S. Cl.
  CPC .......... *G01N 1/2035* (2013.01); *G01F 1/663* (2013.01); *G01N 2001/205* (2013.01); *G05D 7/0664* (2013.01)

(58) Field of Classification Search
  None
  See application file for complete search history.

(56) References Cited

U.S. PATENT DOCUMENTS

| | | | | |
|---|---|---|---|---|
| 2,818,733 A | * | 1/1958 | Stanley, Jr. | G01N 1/18 73/426 |
| 2,884,021 A | * | 4/1959 | Ginsburg | G01N 1/18 141/35 |

(Continued)

FOREIGN PATENT DOCUMENTS

| EP | 2 544 820 | 9/2011 |
|---|---|---|
| EP | 10425062.6 A1 | 9/2011 |

(Continued)

OTHER PUBLICATIONS

Mangin, Derelie, et al. "Chlamydia trachomatis testing sensitivity in midstream compared with first-void urine specimens." The Annals of Family Medicine 10.1 (2012): 50-53. [2] Delanghe, Joris, and Marijn Speeckaert. "Preanalytical requirements of urinalysis." Biochemia medica: Biochemia medica 24.1 (2014): 89-104.

(Continued)

*Primary Examiner* — Lisa M Caputo
*Assistant Examiner* — Nigel H Plumb
(74) *Attorney, Agent, or Firm* — Scully, Scott, Murphy & Presser, PC; Joseph Petrokaitis, Esq.

(57) ABSTRACT

An apparatus for automatically separating and collecting a fluid stream into multiple portions, including a tubing to receive the fluid stream, a plurality of valves attached to the tubing in spaced relation along the length of the tubing and a plurality fluid collection containers attached to the valves. A controller controls the activation of the plurality of valves to collect and separate portions of the fluid stream in the plurality of the fluid collection containers. A flow meter detects the flow of the fluid stream in the tubing and measures a flow rate of the fluid stream. The controller activates the valves based on the detection of the fluid and the flow rate. The controller also activates the valves based on the timing of the fluid stream. The controller also (Continued)

monitors the flow rate over time and activates the valves in sequence based on the flow rate.

20 Claims, 4 Drawing Sheets

(56) References Cited

U.S. PATENT DOCUMENTS

| | | | |
|---|---|---|---|
| 3,750,648 | A | 8/1973 | Gleason et al. |
| 3,982,898 | A | 9/1976 | McDonald |
| 4,457,314 | A | 7/1984 | Knowles |
| 4,492,258 | A | 1/1985 | Lichtenstein et al. |
| 4,570,822 | A * | 2/1986 | Procacino ............... B65B 3/36 137/487.5 |
| 4,981,144 | A | 1/1991 | Carels, Jr. |
| 6,976,398 | B2 | 12/2005 | Leoncavallo et al. |
| 7,461,671 | B2 * | 12/2008 | Ehwald ............ B01L 3/502738 141/198 |
| 9,146,234 | B2 * | 9/2015 | Guzman ............... G01N 33/543 |
| 9,968,336 | B2 | 5/2018 | Van Damme et al. |
| 10,034,659 | B2 | 7/2018 | Siller Gonzalez et al. |
| 2011/0178425 | A1 | 7/2011 | Nishtala et al. |
| 2015/0157300 | A1 | 6/2015 | Ealovega et al. |
| 2015/0351728 | A1 | 12/2015 | Stewart |
| 2017/0196478 | A1 | 7/2017 | Hunter |
| 2017/0333672 | A1 | 11/2017 | Erbey, II et al. |
| 2018/0125697 | A1 | 5/2018 | Ferrera |
| 2018/0177458 | A1 | 6/2018 | Burnett et al. |
| 2018/0214297 | A1 | 8/2018 | Hughett et al. |

FOREIGN PATENT DOCUMENTS

| | | |
|---|---|---|
| WO | 91/01120 A1 | 2/1991 |
| WO | 2010058210 A1 | 5/2010 |
| WO | 2011110469 A1 | 9/2011 |
| WO | 2017078493 A1 | 5/2017 |

OTHER PUBLICATIONS http://www.lpitaliana.com/en/news/2/patented-urine-sample-container-for-testing-drugs-of-abuse.html Patented container (European Patent Appl. EP 10425062.6) with 4 separate compartments of 35 ml each. the division may not be according to flow, May 7, 2016.

Delanghe, et al., "Preanalytical requirements of urinalysis", Biochemia Medica 2014;24(1):89-104, Sep. 30, 2013, pp. 90-104, http://dx.doi.org/10.11613/BM.2014.011.

Nabavizadeh et al., "A New Method to Make 24-Hour Urine Collection More Convenient: A Validity Study", Hindawi Publishing Corporation, International Journal of Nephrology, vol. 2014, Apr. 29, 2014, pp. 1-5, http://dx.doi.org/10.1155/2014/718147.

List of IBM Patents or Patent Applications Treated As Related dated Nov. 13, 2018, pp. 2.

Continence NZ, "Bladder Retraining", Feb. 8, 2013, pp. 1-7, https://www.continence.org.nz/pages/Bladder-Retraining/48/.

Mangin, Derelie, et al. "Chlamydia trachomatis testing sensitivity in midstream compared with first-void urine specimens." The Annals of Family Medicine 10.1 (2012): 50-53.

Office Action dated Nov. 6, 2019 received in U.S. Appl. No. 16/188,895.

* cited by examiner

AUTOMATIC CONTROL OF THE SEPARATION AND COLLECTION OF FLUID

BACKGROUND OF THE INVENTION

This disclosure is directed to fluid sampling and more particularly, to an apparatus and method to automatically separate and collect multiple samples of a fluid.

There is often a need to separate particular portions of a fluid stream, such as for, for example, when a specific type of test is required for a particular portion of the stream.

For example, petrochemical testing may involve collecting multiple samples for testing, but handling multiple sample collection tubes can be difficult and spills can be dangerous. In another example, water testing may involve collecting a series of samples so that changes in the properties of the water (e.g., salinity) over time can be measured. In another example, urinalysis may involve collecting a first-void portion for testing related to certain health conditions and a mid-stream portion for testing related to other health conditions. Manual collection for urinalysis, such as using a plastic cup, is unhygienic, inconvenient, and can be challenging, particularly for young patients, elderly patients, or those with mobility constraints, which may result in testing inaccuracies.

SUMMARY OF THE INVENTION

The present disclosure is directed to an apparatus for automatically separating and collecting multiple samples of a fluid stream. The apparatus includes a tubing to receive the fluid stream. A plurality of valves are attached to the tubing in spaced relation along the length of the tubing and a plurality fluid collection containers are attached to the valves. Each fluid collection container is detachably connected to a respective one of the plurality valves. A controller controls the activation of the plurality of valves to collect and separate portions of the fluid stream in the plurality of the fluid collection containers.

In one embodiment, the apparatus includes a flow meter positioned upstream of the plurality of valves to detect the flow of the fluid stream in the tubing and the plurality of valves are controlled in response to detecting the flow of the fluid stream. In one embodiment, the flow meter measures a flow rate of the fluid stream in the tubing the plurality of valves are controlled in response to the measured flow rate of the fluid stream. In one embodiment the controller determines a timing of the detected flow of the fluid stream and the plurality of valves are controlled based on the timing of the flow of the fluid stream. In one embodiment, the controller monitors the flow rate over time and activates the valves in sequence based on the flow rate.

In one embodiment, a method for automatically separating and collecting a fluid stream into multiple portions is disclosed. The method includes the steps of receiving the fluid stream in a tubing, in which the tubing has a plurality of valves attached to the tubing in spaced relation along the length of the tubing and a plurality fluid collection containers attached to the valves, each fluid collection container being detachably connected to a respective one of the plurality valves. The method includes controlling the plurality of valves to collect and separate portions of the fluid stream in the plurality of the fluid collection containers.

DETAILED DESCRIPTION OF PREFERRED EMBODIMENTS

In one embodiment, this disclosure is directed to an apparatus and method for automatically controlling the separation and collection a fluid stream into multiple discrete containers for analysis. The apparatus and method automatically captures specific phases of the fluid flow thereby avoiding the uncertainty of manual action to separate the phases. In one embodiment, the apparatus and method automatically performs test analysis on the separated phases using an integrated test assembly.

In one embodiment, the apparatus includes a plurality of valves fitted within a fluid flow tube and a plurality of fluid collection container attached to the valves, for controlling the collection and automated separation of fluid into different temporal portions. For example, the portions may be early, middle and late portions based on the start and end of the fluid stream. In one embodiment, as the fluid flows through the tube, a flow meter measures the flow of fluid. The fluid flow measurements are fed to a computer system that controls a plurality of solenoid valves positioned along the flow tube based on the measurements. The valves are controlled in sequence to divert the fluid into each of the corresponding plurality of containers sequentially. For example, as one container is being filled, the valves for all the other compartments are closed.

In one embodiment, the apparatus and method separates the fluid based on the timing of fluid flow. The apparatus and method may include measuring the fluid flow and determining a fluid concentration estimation based on time of the flow. In one embodiment, the apparatus may include fluid collection containers that are removable for remote analysis. In one embodiment, the apparatus and method performs analysis of the fluid using components integrated within the collection apparatus.

Figure 1:
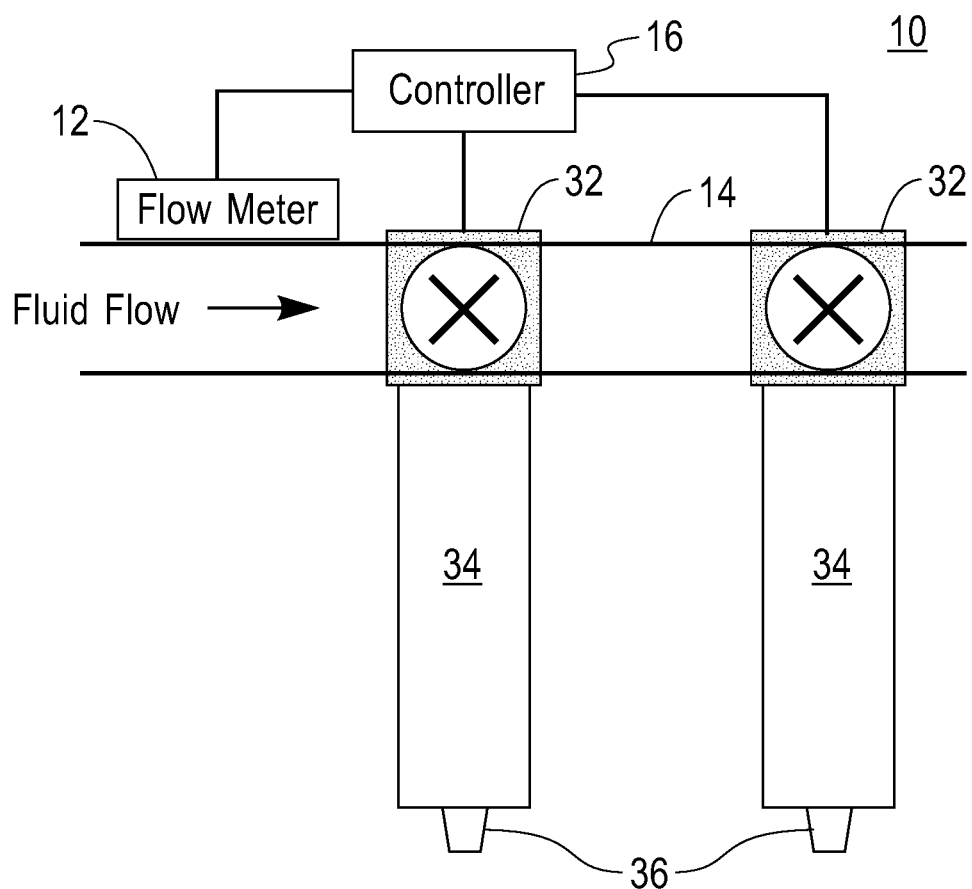
FIG. 1 is a schematic diagram of one embodiment of the apparatus disclosed in this specification for automatically separating and collecting a fluid stream into multiple containers.
Figure 5:
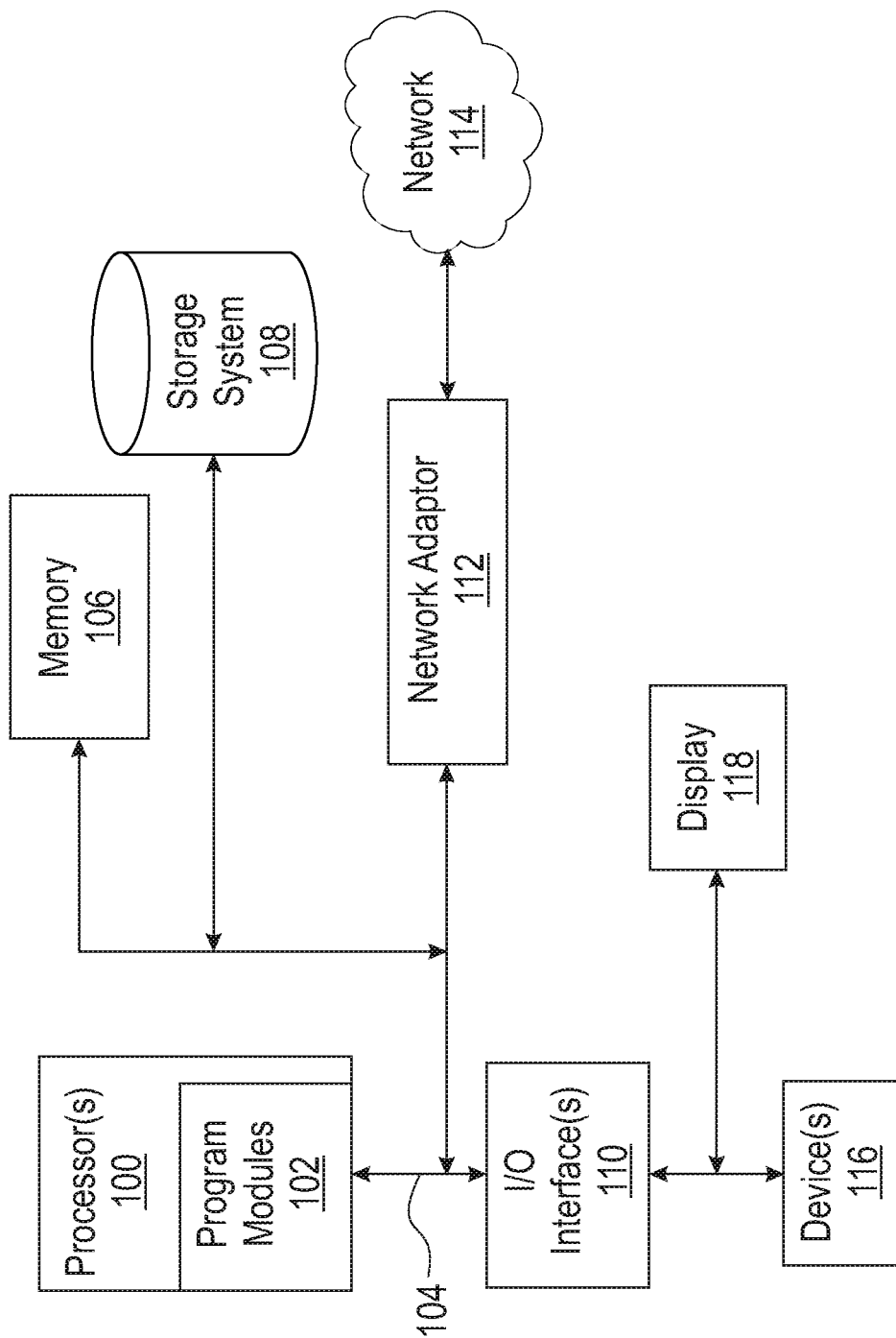
FIG. 5 is a block diagram of an exemplary computing system suitable for implementation of the embodiments of the invention disclosed in this specification.

As shown in FIG. 1, the apparatus 10, according to one embodiment, includes a flow meter 12 positioned on a fluid flow tube 14 to detect and measure the fluid flow. In the embodiment of FIG. 1, the flow meter is located outside of the tubing 14, which permits the flow meter 12 to be positioned anywhere along the tubing, thereby providing flexible usage and servicing. The flow rate meter measurement data is transferred to a controller 16. The measurement data may be transferred using any know data transfer technology, through a direct wired connection or through a network, such as a wireless LAN. Therefore, the controller 16 may be located near or some distance away from the flow meter 12. The controller 16 may be a computing system including one or more processors. One embodiment of a computing system for implementing the controller 16 is shown in FIG. 5 described below. In one embodiment, controller 16 is able to timestamp when the fluid flow occurs, and, therefore, performs the most optimal collections based on the timing.

Figure 2:
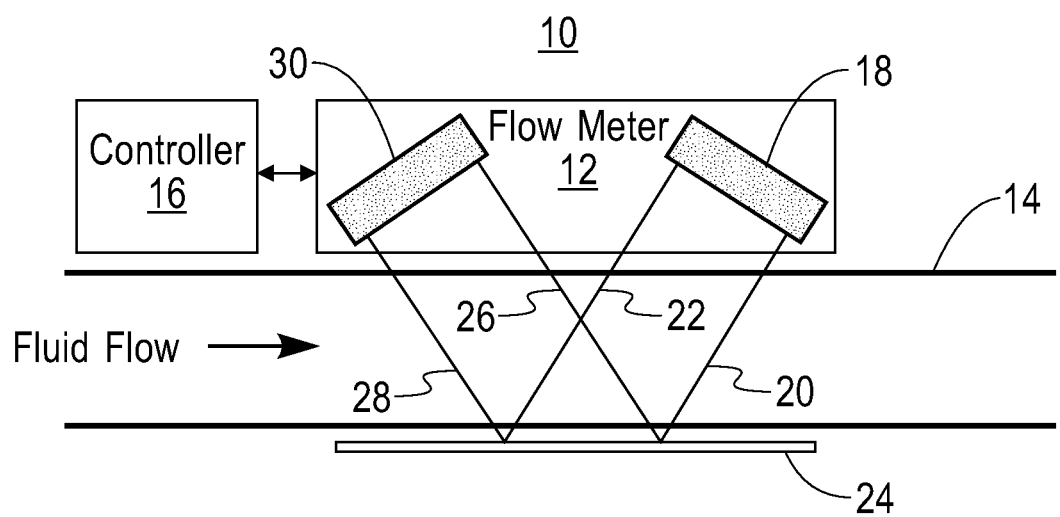
FIG. 2 is a schematic diagram of one embodiment the apparatus disclosed in this specification showing details of a flow meter of the apparatus of FIG. 1.

In the embodiment shown in FIG. 2, the flow meter is an optical Doppler low flow meter. However, any flow meter suitable for detecting and measuring the flow of fluid through a tube may be used, such as an ultrasonic flow meter. The use of an optical Doppler or ultrasonic flow meter allows for complete contactless metering of the liquid flow, as well as being sensitive to varying flow rates. The optical Doppler flow meter can detect shorter optical wavelengths than other known types of flow meters which enables the optical Doppler flow meter to analyze low flow rates undetectable by such other meters.

The optical Doppler technique uses the Doppler shift in a laser beam to measure the velocity of the fluid flow. A laser light source 18 transmits two laser beams 20 and 22 focused a short distance apart in the flow path. The beams 20 and 22 bounce off a reflector 24 and reflected beams are received by a photodetector 30. Small particles which accompany natural gases in the fluid flow pass through the two laser beams 20, 22. Laser light is scattered when a particle crosses the first beam 20. The detecting optics collects scattered and reflected light 26 on the photodetector, which then generates a pulse signal. As the same particle crosses the second beam 22, the detecting optics collect scattered and reflected light beam 28 on the photodetector 30, which converts the incoming light into a second electrical pulse. The pulse signals are transmitted to the controller 16 which measures the Doppler shift between the pulses and then calculates the velocity of the fluid flow.

An ultrasonic flow meter is a type of flow meter that measures the velocity of a fluid with ultrasound to calculate volume flow. Using ultrasonic transducers, the flow meter can measure the average velocity along the path of an emitted beam of ultrasound, by averaging the difference in measured transit time between the pulses of ultrasound propagating into and against the direction of the flow.

Alternatively, the flow meter may be located within the collection tube and include a sensor for detecting the fluid flow rate. The meter can determine the amount of fluid entering the meter over a known time by including a timer with a calibrated measurement region to approximate the rate of fluid entering the measurement region. The flow data sensed by the meter is transmitted to the microprocessor to calculate the flow rate.

Returning to FIG. 1, a plurality of valves 32 are located along the tube 14 after the flow meter 12 at various points along the tube line. The valves 32 can be electrically controllable, such as a solenoid valve. A collection container 34 is connected to each valve 32. In one embodiment, the valves 32 include connectors that allow the tube 14 to be connected to opposite sides of the valves. The collection containers 34 may be constructed to be removed and reattached easily. A waste outlet 36 on each container 34 can be connected to discard fluid after analysis is completed. In the embodiment in which the valves 32 are wired to the controller 16, the valves 32 should be located in close proximity to the controller 16 as is reasonable to enable safe cable management due to shorter cables and easier collection facility. In one embodiment, the collection containers 34 include a threaded top portion for connecting and disconnecting to the valves 32. Inside the threaded top is a retainer that prevents liquid from exposure and spillage until removed manually by a technician for fluid testing and analysis.

When a fluid flow is detected, the controller 16 is programmed to monitor flow rates over time and to subsequently activate the solenoid valves 32 in sequence. In one embodiment, as the fluid flows through the tube, the flow meter 12 measures the flow of fluid. The fluid flow measurements are fed to microprocessor 16 which controls the plurality of solenoid valves 32 positioned along the flow tube 14 based on the measurements. The valves 32 are controlled in sequence to divert the fluid into each of the containers 34 sequentially. As one container 34 is being filled, the valves 32 for all the other containers 34 are closed.

The solenoid valves 32 being connected to the controller 16 allows the timed collection of fluid according to the detected flow. In one embodiment, the controller 16 is programmed for controlling the collection and automated separation of fluid into different temporal portions, such as early, middle, late portions of the fluid flow.

Figure 3:
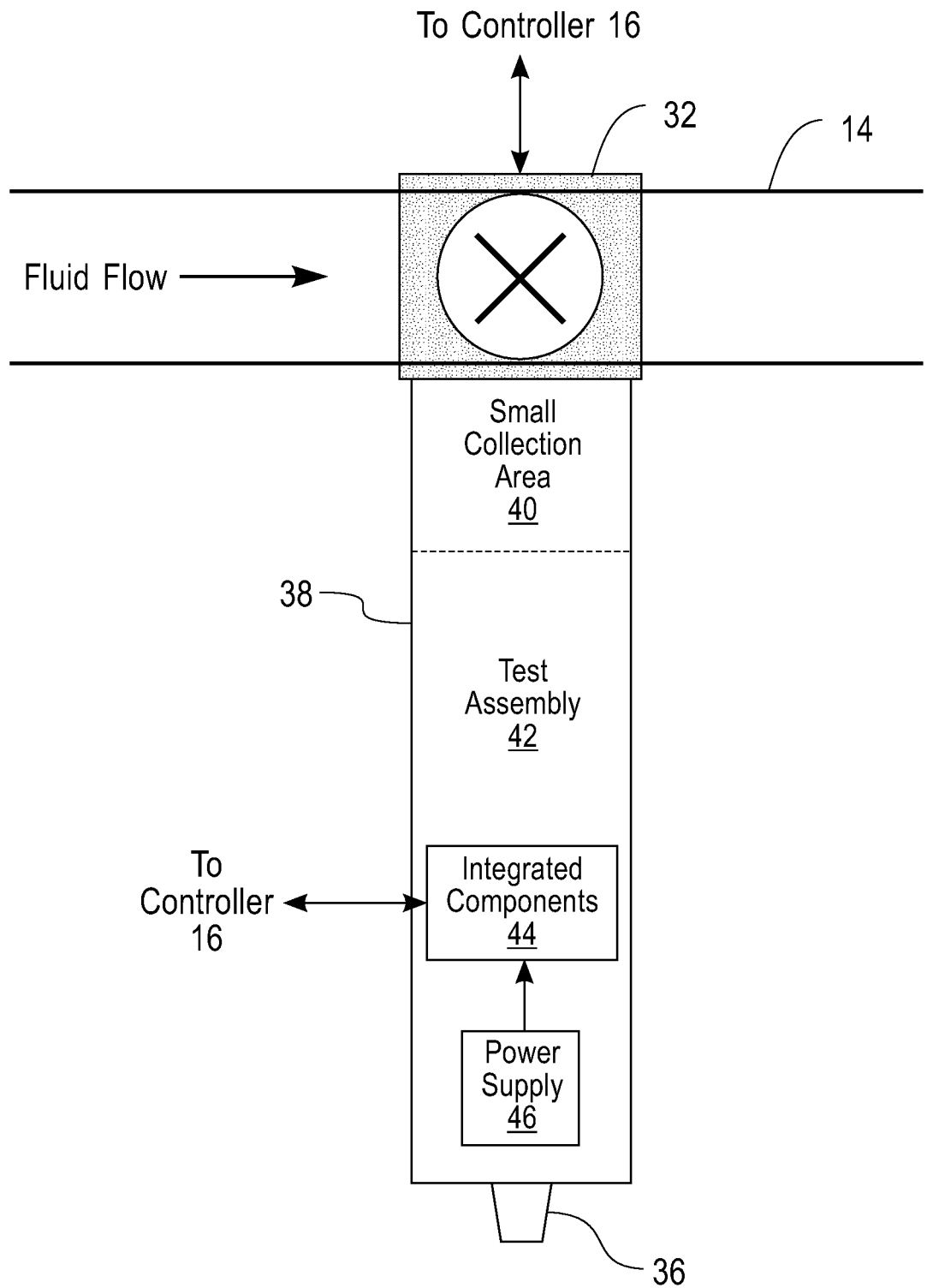
FIG. 3 a schematic diagram of one embodiment of the apparatus disclosed in this specification showing details of one embodiment of a fluid collection container.

In one embodiment, as shown in FIG. 3, collection containers 38 replace fluid containers 34. Fluid containers 38 consist of a small collection area 40 and a test assembly area 42. The test assembly area 42 includes integrated components 44 to perform specific self contained fluid analysis tests directly on the collected fluid.

For example, the integrated components 44 could perform following typical tests based on a reagent strip: Specific Gravity (SG), pH, Protein, Glucose, Ketones, Blood (hemoglobin) and Myoglobin, Leukocyte Esterase, Nitrite, Bilirubin, Urobilinogen. The tests could be performed by holding a reagent strips in a form within the assembly area 42 and tests can be performed on tiny amounts of fluid upon a strip at a time. In one embodiment, the results can be subsequently observed via a micro camera within integrated components 44 and the results linked to controller 16.

In one embodiment, the integrated components 44 include one or more electronic components for sensing, calculating, displaying, transmitting, and/or storing one or more characteristics of the fluid flow. In one embodiment, the integrated components 44 may include a meter or other measuring device for measuring the temperature, the pH, the chemical composition (e.g., concentration or presence of urea, ions, salts, hormones, proteins, lipids, etc.), osmotic pressure, or any other characteristic of the fluid flow. For example, the meter may include one or more sensors (e.g., electrical, chemical, chemoelectric, etc.) to help determine one or more characteristics. The meter may be linked to controller 16, to detect, store, transmit, analyze and display the characteristics that are detected.

The integrated components 44 will require adequate power supply that is stable and reliable. The integrated components can be connected directly to a main supply, such as that of the controller 16. Alternatively, a self contained battery supply 46 within the assembly area 42 may be employed. The embodiment of FIG. 3 provides the ability for to continuous analysis of the fluid flow, while not requiring manual.

Figure 4:
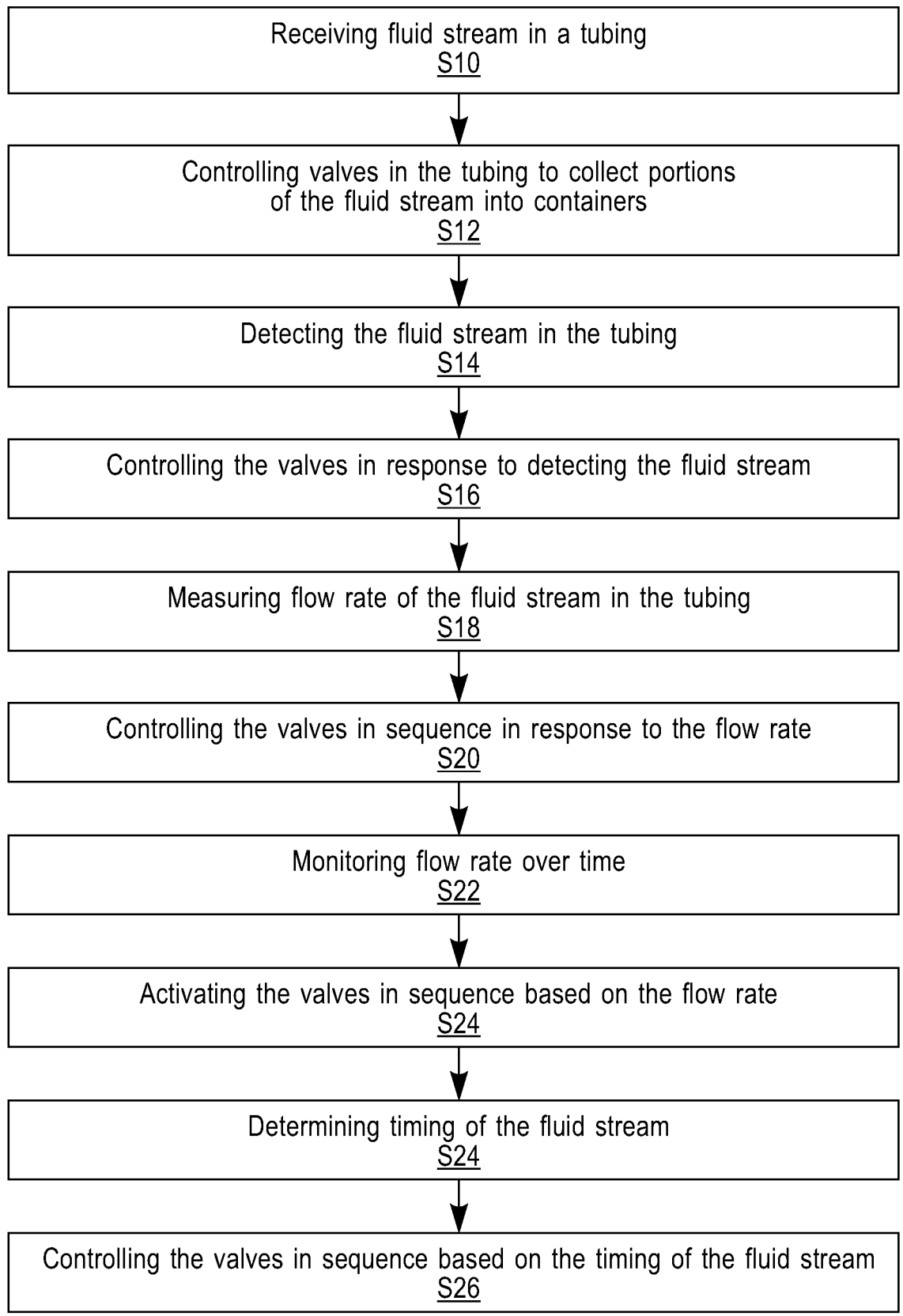
FIG. 4 is a flow diagram of one embodiment of the method disclosed in the specification.

In one embodiment, a method for automatically separating and collecting a fluid stream into multiple portions is disclosed. As shown in FIG. 4, the method includes step S10 of receiving fluid stream in a tubing. In one embodiment, the tubing has a plurality of valves attached to the tubing in spaced relation along the length of the tubing and a plurality fluid collection containers, each fluid collection container being detachably connected to a respective one of the plurality valves. In step S12, the method includes controlling the plurality of valves to collect and separate portions of the fluid stream in the plurality of the fluid collection containers. The method may also include step S14 of detecting the fluid stream in the tubing and step S16 of controlling the valves in response to detecting the fluid stream. The method may also include step S18 of measuring flow rate of the fluid stream in the tubing and step S20 of controlling the valves in sequence in response to the flow rate. The method may further contain step S22 of monitoring flow rate over time and step S24 of activating the valves in sequence based on the flow rate. The method may further include S24 of determining timing of the fluid stream and step S26 of controlling the valves in sequence based on the timing of the fluid stream.

FIG. 5 illustrates a schematic of an example computer or processing system that may implement the method for an apparatus and method to automatically separate and collect the fluid stream into multiple portions in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. An apparatus for automatically separating and collecting a fluid stream into multiple portions, the apparatus comprising:
   a tubing configured to receive the fluid stream;
   a plurality of valves attached to the tubing in spaced relation along the length of the tubing;

a plurality fluid collection containers, each fluid collection container being detachably connected to a respective one of the plurality valves; and a controller for controlling the plurality of valves to collect and separate portions of the fluid stream in the plurality of the fluid collection containers.

2. The apparatus of claim 1, further including a flow meter positioned upstream of the plurality of valves, the flow meter being configured to detect the flow of the fluid stream in the tubing.

3. The apparatus of claim 2, wherein the controller is configured to control the plurality of valves in response to detecting the flow of the fluid stream.

4. The apparatus of claim 3, wherein the controller is configured to determine a timing of the detected flow of the fluid stream.

5. The apparatus of claim 4, wherein the controller is configured to control the plurality of valves based on the timing of the flow of the fluid stream.

6. The apparatus of claim 5, wherein the controller is configured to monitor the flow rate over time and to activate the valves in sequence based on the flow rate.

7. The apparatus of claim 1, further including a flow meter positioned upstream of the plurality of valves, the flow meter being configured to measure a flow rate of the fluid stream in the tubing.

8. The apparatus of claim 7, wherein the controller is configured to control the plurality of valves in response to the measured flow rate of the fluid stream.

9. The apparatus of claim 7, wherein the flow meter is an optical Doppler low flow rate meter.

10. The apparatus of claim 7, wherein the flow meter is an ultrasonic flow rate meter.

11. The apparatus of claim 1, wherein the valves are solenoid valves.

12. The apparatus of claim 1, wherein the plurality of fluid collection containers include a testing assembly, comprising at least one fluid test component configured to perform at least one fluid test analysis on the collected portion of the fluid stream.

13. A method for automatically separating and collecting a fluid stream into multiple portions, the method comprising the steps of:

receiving the fluid stream in a tubing, the tubing having a plurality of valves attached to the tubing in spaced relation along the length of the tubing and a plurality fluid collection containers, each fluid collection container being detachably connected to a respective one of the plurality valves; and controlling the plurality of valves to collect and separate portions of the fluid stream in the plurality of the fluid collection containers.

14. The method of claim 13, further including detecting the flow of the fluid stream in the tubing.

15. The method of claim 14, further including controlling the plurality of valves in response to detecting the flow of the fluid stream.

16. The method of claim 13, further including to measuring a flow rate of the fluid stream in the tubing.

17. The method of claim 16, further including controlling the plurality of valves in sequence in response to the measured flow rate of the fluid stream.

18. The method of claim 17, further including monitoring the flow rate over time and activating the valves in sequence based on the flow rate.

19. The method of claim 13, further including determining a timing of the detected flow of the fluid stream.

20. The method of claim 19, further including controlling the plurality of valves in sequence based on the timing of the flow of the fluid stream.

* * * * *